(12) United States Patent
Igarashi

(10) Patent No.: US 11,520,542 B2
(45) Date of Patent: Dec. 6, 2022

(54) MANAGEMENT APPARATUS FOR EDITING SETTING INFORMATION ACROSS A PLURALITY OF TABS

(71) Applicant: CANON KABUSHIKI KAISHA, Tokyo (JP)

(72) Inventor: Toshiaki Igarashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/461,746

(22) Filed: Aug. 30, 2021

(65) Prior Publication Data
US 2022/0075575 A1 Mar. 10, 2022

(30) Foreign Application Priority Data

Sep. 4, 2020 (JP) .............................. JP2020-148693

(51) Int. Cl.
*G06F 3/12* (2006.01)
*H04N 1/00* (2006.01)

(52) U.S. Cl.
CPC .......... *G06F 3/1231* (2013.01); *G06F 3/1204* (2013.01); *G06F 3/1226* (2013.01); *G06F 3/1232* (2013.01); *H04N 1/00432* (2013.01)

(58) Field of Classification Search
CPC ...... G06F 3/1229; G06F 3/123; G06F 3/1231; G06F 3/1204; G06F 3/1226; G06F 3/1232; G06F 3/1286; H04N 1/00432
USPC ........................................................ 358/1.15
See application file for complete search history.

(56) References Cited

U.S. PATENT DOCUMENTS

| 2010/0097630 A1* | 4/2010 | Schwartz | .............. | G06F 3/1239 |
| | | | | 358/1.15 |
| 2015/0234555 A1* | 8/2015 | Kobayashi | .......... | G06F 3/04817 |
| | | | | 715/777 |

FOREIGN PATENT DOCUMENTS

JP 2009187460 A 8/2009

* cited by examiner

*Primary Examiner* — Kent Yip
(74) *Attorney, Agent, or Firm* — Canon U.S.A., Inc. IP Division

(57) ABSTRACT

After setting information is changed on an edition screen including a plurality of tabs, a confirmation message for each tab to which the changed setting information belongs is displayed.

9 Claims, 9 Drawing Sheets

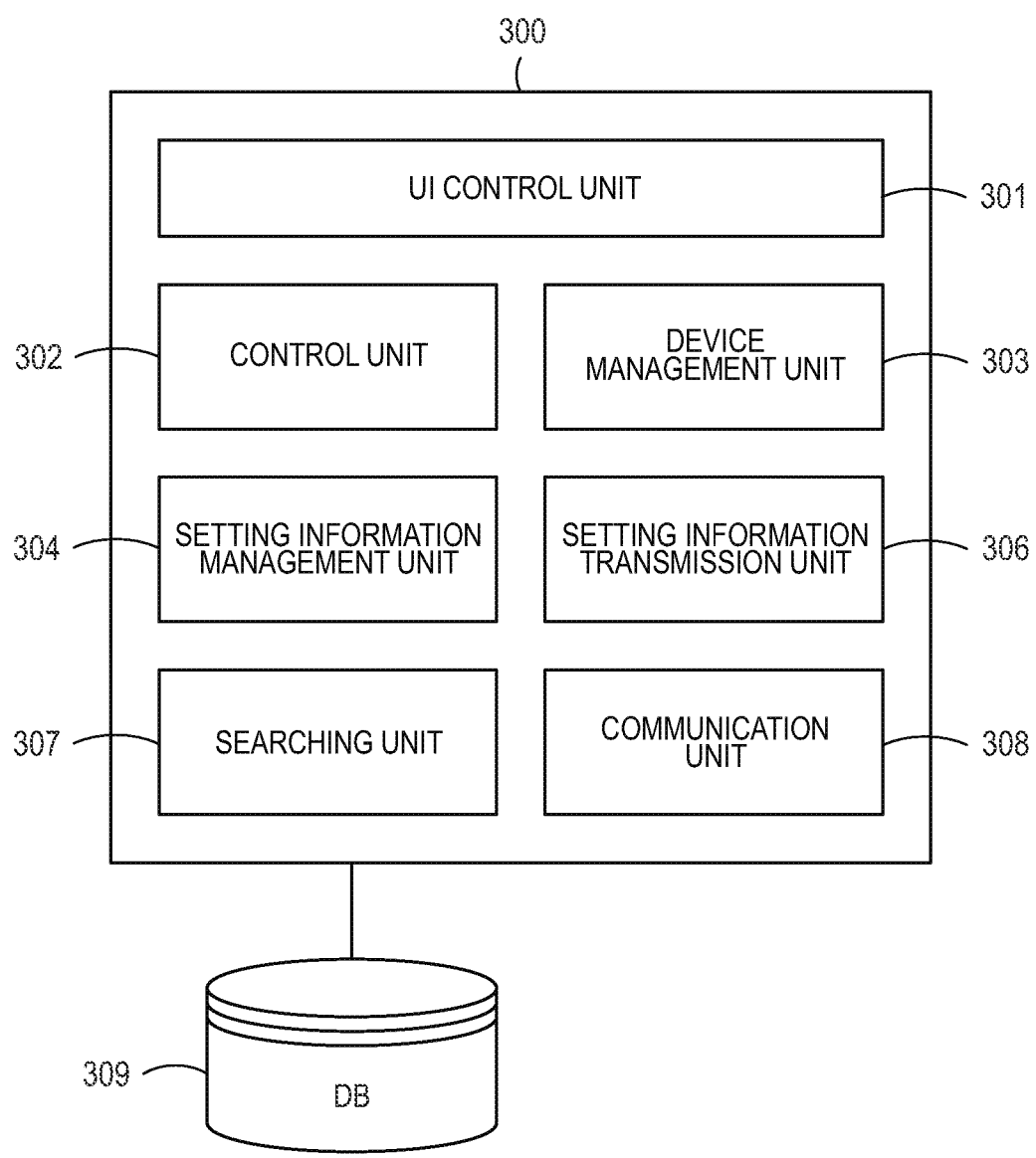

FIG. 4A

DEVICE MANAGEMENT TABLE 400

| SN | IP address | Device name | Product name | Installation location |
|---|---|---|---|---|
| ABC123 | 10.1.1.10 | Device A | MFP A | OfficeA |
| ABC456 | 10.1.1.20 | Device B | MFP B | OfficeB |
| ABC789 | 10.1.1.30 | Device C | MFP C | OfficeC |

FIG. 4B

SETTING INFORMATION MANAGEMENT TABLE 420

| SN | Tab name | Setting item | Setting value | Edition status |
|---|---|---|---|---|
| ABC123 | Environment | Device name | Device A | Not edited |
| ABC123 | Environment | Installation location | OfficeA | Edited |
| ABC123 | Network | IP address | 1.2.3.4 | Edited |
| ABC123 | Network | Subnet mask | 255.255.255.0 | Not edited |
| ABC123 | Others | Sound volume setting | Low | Edited |
| ABC123 | Others | Default sheet size | A4 | Not edited |
| ABC456 | ... | ... | ... | ... |
| ABC789 | ... | ... | ... | ... |

FIG. 5A (1)

Device list — 500

| Serial number (501) | IP address (502) | Device name (503) | Product name (504) | Installation location (505) |
|---|---|---|---|---|
| ABC123 | 10.1.1.10 | Device A | MFP A | OfficeA |
| ABC456 | 10.1.1.20 | Device B | MFP B | OfficeB |
| ABC789 | 10.1.1.30 | Device C | MFP C | OfficeC |

[Search] 506  [Delete] 507  [Edit settings] 508

[End] 509

(2)

Setting information edition screen — 520

| Serial number (521) | IP address (522) | Device name (523) | Product name (524) | Installation location (525) |
|---|---|---|---|---|
| ABC123 | 10.1.1.10 | Device A | MFP A | OfficeA |

526 — Environment | Network (527) | Others (528)

Device name : [Device A] 529

Installation location : [OfficeA] 530

[Send] 531

[All send] 532  [End] 533

FIG. 5B
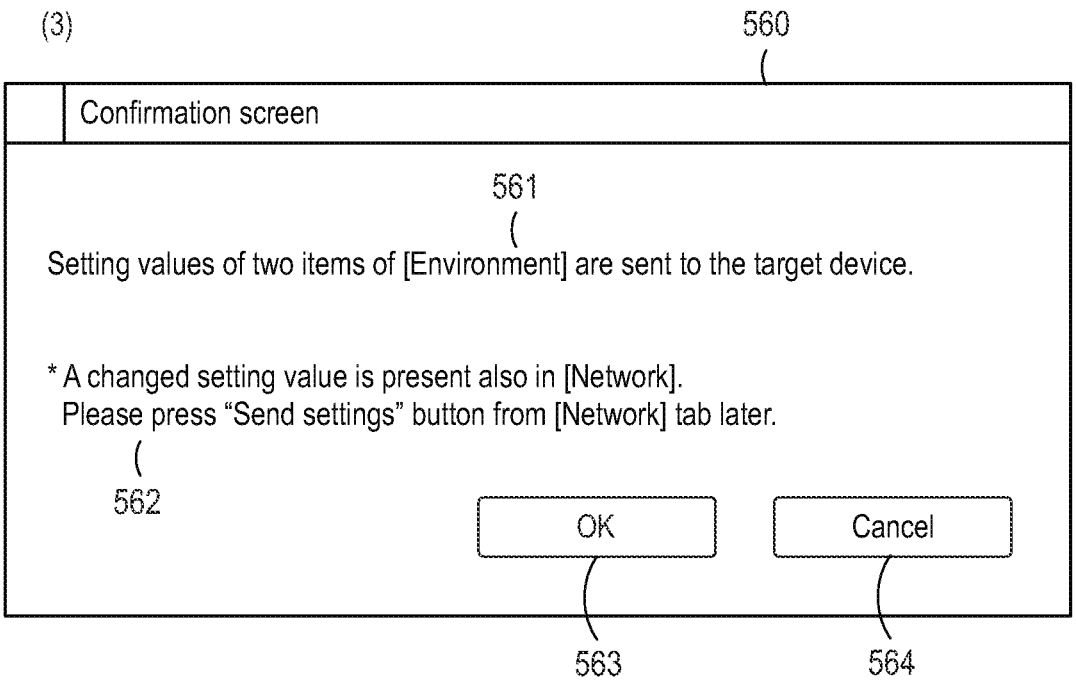
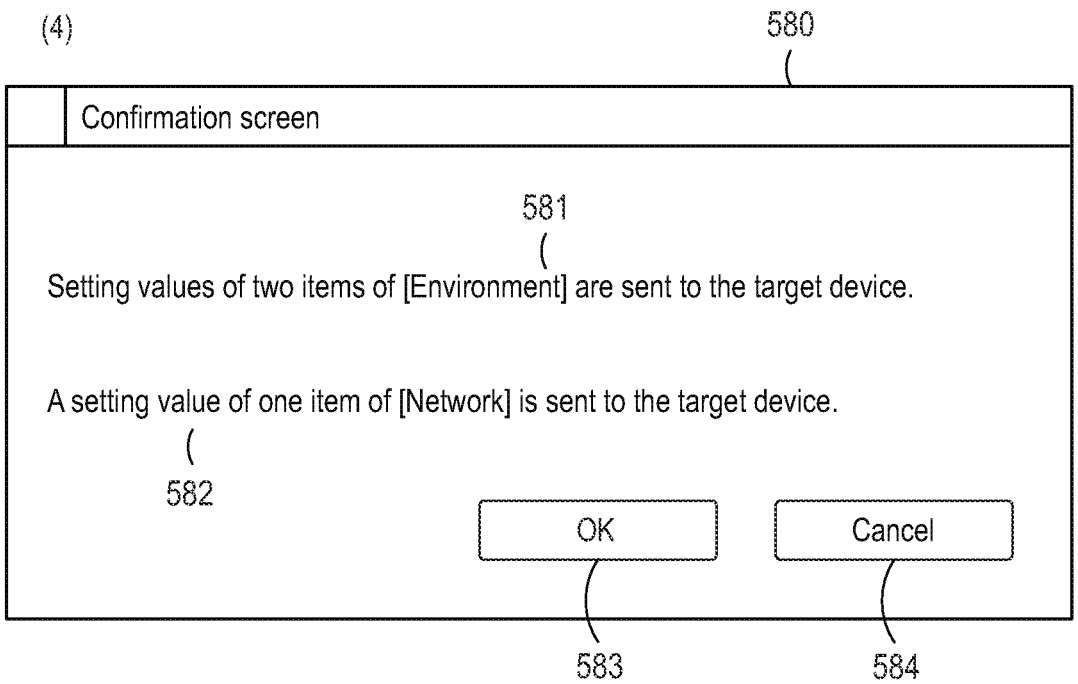

MANAGEMENT APPARATUS FOR EDITING SETTING INFORMATION ACROSS A PLURALITY OF TABS

BACKGROUND

Field

The present disclosure relates to a management apparatus, a management system, a control method of a management apparatus, and a storage medium that can edit setting information set in an information processing device.

Description of the Related Art

There has been a system in the past in which a device represented by a network device or a multifunction peripheral (MFP) and a management apparatus (for example, a personal computer (PC)) are communicably connected to each other. In such a system, setting information changed by a user on a user interface (UT) of the management apparatus is transmitted to the device, if necessary.

Typically, since there are many (over several hundreds) pieces of device setting information, the management apparatus categorizes associated pieces of setting information into a plurality of groups, and pieces of setting information are displayed on a group basis (hereafter, each group on a UI is referred to as "tab"). Japanese Patent Application Laid-Open No. 2009-187460 discloses a form of transmitting changed contents of pieces of setting information present across a plurality of tabs to a device.

In the case of Japanese Patent Application Laid-Open No. 2009-187460, however, when sending a changed content of setting information, the user is unable to recognize which tab the changed content of setting information belongs to will be sent. This may cause omission of transmission, erroneous setting, or the like of setting information edited in the management apparatus.

SUMMARY

A management apparatus of the present disclosure is configured to edit multiple pieces of setting information to be set in an information processing device, the management apparatus comprising: at least one memory that stores instructions; and at least one processor that executes the instructions to perform: on a first user interface, displaying a plurality of tabs in a selectable manner in which the multiple pieces of setting information are arranged on a group basis and displaying setting information in an editable manner which belongs to one selected tab of the plurality of tabs; and displaying a first message related to setting information which belongs to the one selected tab and was edited on the first user interface and a second message related to setting information which belongs to a tab other than the one selected tab and was edited on the first user interface.

Further features of the present disclosure will become apparent from the following description of exemplary embodiments with reference to the attached drawings.

BRIEF DESCRIPTION OF THE DRAWINGS

FIG. 3 illustrates a function configuration example of a management program according to the present disclosure.

FIG. 4A illustrates a configuration example of a device management table managed by the management apparatus according to the present disclosure.

FIG. 4B illustrates a configuration example of a setting information management table managed by the management apparatus according to the present disclosure.

FIG. 5A illustrates an example of a UI screen of the management apparatus according to the present disclosure.

FIG. 5B illustrates an example of a UI screen of the management apparatus according to the present disclosure.

DESCRIPTION OF THE EMBODIMENTS

Embodiments for implementing the present disclosure will be described below with reference to the drawings. Note that the embodiments described below are mere examples and are not intended to limit the scope of the present disclosure thereto. Further, not all the combinations of features described in the following embodiments are necessarily essential for the solution of the present disclosure.

First Embodiment

The best mode for implementing the present disclosure will be described below with reference to the drawings.

Figure 1:
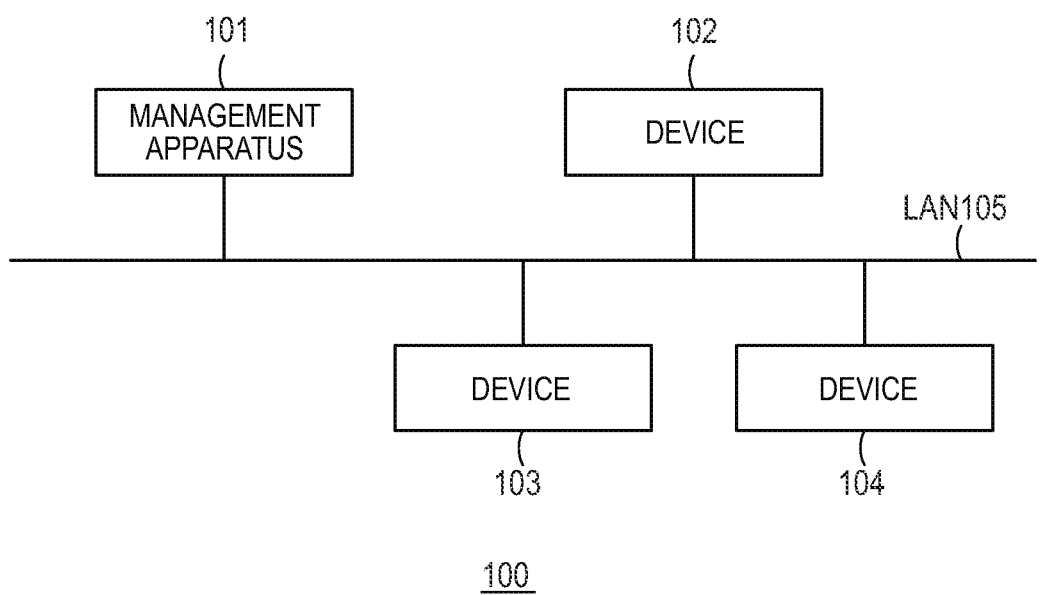
FIG. 1 illustrates a configuration example of a system according to the present disclosure.

FIG. 1 is a diagram illustrating a configuration example of a management system 100 of the present embodiment. The management system 100 includes a management apparatus 101 represented by a PC and information processing devices (hereafter, referred to as "device") 102 to 104 represented by an image forming device. All the management apparatus 101 and the devices 102 to 104 are connected to a network via a local area network (LAN) 105.

Note that, although the number of devices is three in FIG. 1, the number of devices may be one or may be plural. Further, in the following, the content common to the devices 102 to 104 may be collectively described as "device 102" for simplified illustration.

Figure 2A:
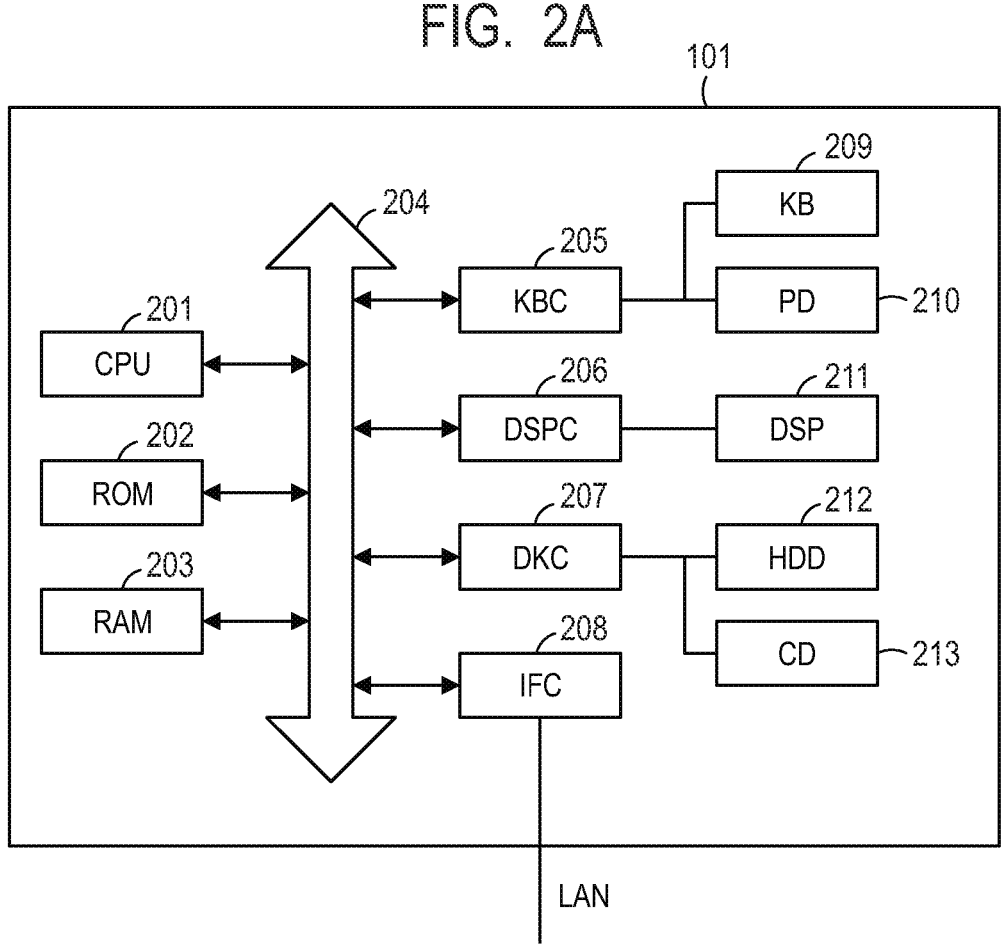
FIG. 2A illustrates a hardware configuration example of a management apparatus according to the present disclosure.

FIG. 2A is a block diagram illustrating a hardware configuration example of the management apparatus 101. In the present embodiment, the management apparatus 101 is formed of a PC.

A CPU 201 is a performing subject on hardware unless otherwise specified in the entire description below. On the other hand, the controlling subject on software is a management program stored in a hard disk (HDD) 212.

A ROM 202 stores a BIOS or a boot program. A RAM 203 functions as a main memory, a work area, or the like of the CPU 201.

A keyboard controller (KBC) 205 controls instruction input from a keyboard (KB) 209, a pointing device (PD) 210, or the like. The display controller (DSPC) 206 controls display on a display (DSP) 211. A disc controller (DKC) 207 controls access to a storage device such as the hard disk (HDD) 212, a CD-ROM (CD) 213, or the like.

The hard disk (HDD) 212, the CD-ROM (CD) 213, and the like store a boot program, operating system, a database, a management program and the data thereof, or the like. An interface controller (IFC) 208 transmits and receives information to and from another network device via a LAN. Each of these components is arranged on a system bus 204.

Note that the management program according to the present embodiment may be supplied in a form of being stored in a storage medium such as a CD-ROM. In such a case, the management program is read from a storage medium by the CD-ROM (CD) 213 or the like illustrated in FIG. 2A and installed in the hard disk (HDD) 212.

Figure 2B:
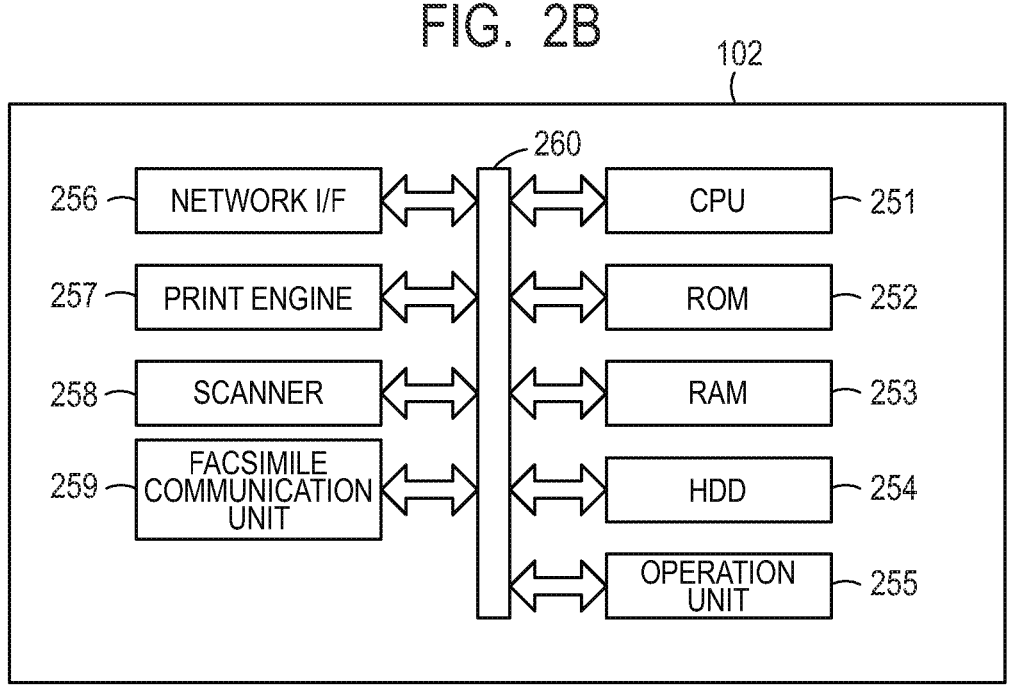
FIG. 2B illustrates a hardware configuration example of a device according to the present disclosure.

FIG. 2B is a block diagram illustrating a hardware configuration example of the device 102. In the present embodiment, the device is formed of an MFP. The hardware configuration of the devices 103 and 104 may be the same as that of the device 102. Note that the hardware configurations of respective devices 102 to 104 may be different from each other, and the devices 102 to 104 may be information processing devices or the like other than an MFP.

A CPU 251 is responsible for control of the entire device 102. A ROM 252 stores the serial number of the device 102 or the like. A RAM 253 is used as a work area of the CPU 251, a receiving buffer, image rendering, or the like. A hard disk (HDD) 254 stores firmware, an extension program, font data, or the like.

An operation unit 255 is formed of various switches, buttons, a liquid crystal display unit for message display, or the like. A network I/F 256 transmits and receives information to and from another network device via a LAN. A print engine 257 performs printing on a recording sheet. A scanner 258 reads a document, and a facsimile communication unit 259 transmits and receives a facsimile.

Each of these components is arranged on a system bus 260.

FIG. 3 is a diagram illustrating a function configuration example of a management program 300 operating on the management apparatus 101.

Each function of the management program 300 illustrated in FIG. 3 is implemented when executed by the CPU 201.

A UI control unit 301 provides a graphical user interface used for the user to operate the management program 300. The graphical user interface is configured as a web page that can be displayed on another PC by using Hypertext Transfer Protocol (HTTP). Alternatively, the graphical user interface may be configured to be displayed on the display 211 provided to the management apparatus 101.

The control unit 302 instructs various processes described later for each function in the management program 300 in accordance with an instruction from the UI control unit 301 or a request received by a communication unit 308.

A device management unit 303 performs a device search process. The device search process is a process of searching for a device connected to the LAN 105 via a searching unit 307. Searching for a device can be implemented by transmitting a search request packet such as Service Location Protocol (SLP), Simple Network Management Protocol (SNMP), or the like. It is also possible to further acquire detail information (model name, serial number, capability, condition, or the like) on a device via the communication unit 308 with respect to a device found by searching. The device management unit 303 then stores location information on a device (IP address) and information acquired from the device in a device management table 400 on a database (DB) 309.

A setting information management unit 304 stores setting information input by the user on a setting information edition screen 520 described later in a setting information management table 420 on the DB 309.

A setting information transmission unit 306 transmits setting information to a device via the communication unit 308.

A searching unit 307 searches for a device connected to the LAN 105 via the communication unit 308.

The communication unit 308 communicates with a device in accordance with instructions from the setting information transmission unit 306 and the searching unit 307. The communication protocol used for communication with a device is assumed to be SLP, SNMP, a web service, or the like but not limited thereto. Further, the communication unit 308 is responsible for HTTP communication and transmits, to another PC, a web page received from the UI control unit 301, if necessary.

The DB 309 is a database storing various tables described later. Information managed in the DB 309 can also be viewed by the user via the UI control unit 301.

FIG. 4A and FIG. 4B illustrate examples of tables managed by the DB 309. Note that the table configuration of FIG. 4A and FIG. 4B is an example and may be a table configuration different from the present example.

FIG. 4A is an example of a device management table 400 and is formed of a column 401 to a column 405. One record indicated on each row represents device information on one device.

The column 401 represents a serial number (SN), and serial numbers of devices are stored therein. The column 402 represents an IP address and stores IP addresses of devices. The column 403 represents a device name and stores nicknames of devices. The column 404 represents a product name and stores product names of devices. The column 405 represents an installation location and stores information on locations where devices are installed. Note that the device management table 400 may include, for example, information on error status, options, or the like of a device other than detail information of the columns 401 to 405. The value of each column of the device management table 400 is updated by a device search process performed by the device management unit 303 when a search button 506 in a device list 500 described later is pressed.

FIG. 4B is an example of the setting information management table 420 and formed of columns 421 to 425. One record indicated on each row represents one piece of setting information.

The column 421 represents a serial number (SN) and stores serial numbers of devices having setting information in the present record. The column 422 represents a tab name and stores names of tabs to which setting items written in the column 423 belongs. For example, in the example of FIG. 4B, it can be seen that setting items "Device name" and "Installation location" are included in the "Environment" tab.

The column 423 represents a setting item and stores setting items included in devices. Note that the setting item indicated in the column 423 of FIG. 4B is an example and not limited thereto. The column 424 represents a setting value and stores setting values corresponding to setting items written in the column 423.

The column 425 represents the edition status and stores whether or not the setting information written in the column 423 or the column 424 has been edited. If "Edited" is stored, this represents that the setting information of interest has been edited by the user. If "Not edited" is stored, this represents that the setting information of interest has not been edited by the user. Note that "edit/edition" as used herein refers to a user changing a setting value of each setting item on the setting information edition screen 520 described later. Therefore, a change of the value of the column 425 from "Not edited" to "Edited" does not cause a simultaneous change of the value of the column 424. The value of the column 424 will be changed after setting information changed by the user is transmitted to a device and an acknowledgment of successful setting is received from the device. The details will be described with the setting information edition screen 520 of FIG. 5B.

FIG. 5A and FIG. 5B illustrate examples of respective screens as a user interface (UI) displayed on the display 211 of the management apparatus 101 by the UI control unit 301 of the management program 300.

The device list 500 of FIG. 5A(1) is a screen displayed in response to the user starting up the management program 300.

In FIG. 5A(1), the value of the column 401 of the device management table 400 (FIG. 4A) is displayed in the serial number 501.

The values of the columns 402 to 405 of the device management table 400 are also displayed in the same manner in the IP address 502, the device name 503, the product name 504, and the installation location 505, respectively.

Once the user presses the search button 506, the device management unit 303 performs a device search process and stores the result thereof in the device management table 400 of the DB 309. In response to the user selecting any row from the device list and pressing a delete button 507, the device management unit 303 deletes a record of the device information of interest from the device management table 400 of the DB 309.

Once the user selects any row from the device list and presses a setting edition button 508, the setting information edition screen 520 described later (FIG. 5A(2)) is displayed. At this time, the UI control unit 301 acquires information on a device selected from the device management table 400 or the setting information management table 420 and displays the acquired information on the setting information edition screen 520.

Further, when an end button 509 is pressed, the UI control unit 301 ends the display of the device list 500.

The setting information edition screen 520 of FIG. 5A(2) is a screen displayed when the setting edition button 508 is pressed in the screen of the device list 500.

In FIG. 5A(2), the values of the columns 401 to 405 in the device management table 400 are displayed in the serial number 521, the IP address 522, the device name 523, the product name 524, and the installation location 525, respectively.

In the setting information edition screen 520, a plurality of tabs that display, on a group basis, the setting information recorded in the setting information management table 420 are displayed in a selectable manner. In the example of FIG. 5A(2), a plurality of tabs of an environment tab 526, a network tab 527, and an others tab 528 are displayed. The values of the column 422 of the setting information management table 420 are displayed as tab names in respective tabs.

In the setting information edition screen 520, setting values for one or a plurality of setting items belonging to one selected tab out of a plurality of tabs are displayed. The user is able to edit the setting value belonging to the selected tab in the setting information edition screen 520. In the example of FIG. 5A(2), the device name 529 and the installation location 530 are displayed as setting information belonging to the environment tab 526.

Once any tab is selected from the tabs 526 to 528 by the user, the UI control unit 301 acquires, from the column 423 and the column 424, device information whose value of the column 422 in the setting information management table 420 matches the selected tab. Further, the UI control unit 301 displays the acquired setting information on the setting information edition screen 520 as setting information belonging to the selected tab. In FIG. 5A(2), since the environment tab 526 has been selected, the device name 529 and the installation location 530 associated with the environment tab 526 are displayed as setting information. When the user changes these pieces of setting information, the values of the corresponding records in the edition status 425 are changed to "Edited".

Once a send button 531 is pressed in the setting information edition screen 520, the setting information management unit 304 of the management program 300 transmits setting information edited by the user on the selected tab to the device via the setting information transmission unit 306. Specifically, the setting information management unit 304 extracts a record whose value of the SN 421 matches the value of the serial number 521 from the setting information management table 420. Furthermore, the setting item 423 of a record whose value of the tab name 422 matches the selected tab and whose value of the edition status 425 is "Edited" is extracted from the extracted record. Finally, the setting value 424 corresponding to the extracted setting item 423 is identified on the setting information edition screen 520 and transmitted to the device.

The UI control unit 301 displays a confirmation screen 560 (FIG. 5B(3)) described later immediately before the setting information management unit 304 transmits setting information to a device and finally confirms with the user whether or not to transmit the setting information. In response to receiving an acknowledgment of successful setting from the device, the setting information management unit 304 stores the transmitted setting information in the corresponding record in the setting information management table 420. Further, the value of the edition status 425 of the corresponding record is returned to "Not edited".

In response, when an all-send button 532 is pressed in the setting information edition screen 520, the setting information management unit 304 of the management program 300 transmits setting information changed by the user on all the tabs to the device. Since this process is the same as the transmission process for the send button 531 except that setting information in all the tabs instead of in a particular tab selected from the tabs 526 to 528 is targeted, the detailed description thereof will be omitted.

Further, when an end button 533 is pressed, the UI control unit 301 discards the edition result of the setting information edition screen 520 and ends the display of the setting information edition screen 520. Further, the setting information management unit 304 returns the value of the edition status 425 in the corresponding record to "Not edited".

FIG. 5B illustrates an example of each confirmation screen displayed when setting information edited in the setting information edition screen 520 is transmitted.

The confirmation screen 560 of FIG. 5B(3) is an example of a screen displayed in response to the send button 531 being pressed in the setting information edition screen 520. On the other hand, a confirmation screen 580 of FIG. 5B(4) is an example of a screen displayed in response to the all-send button 532 being pressed in the setting information edition screen 520.

A current-tab confirmation message 561 is displayed in the confirmation screen 560 of the FIG. 5B(3) displayed in response to the send button 531 being pressed. The current-tab confirmation message 561 is a message for notifying the user that setting information belonging to the tab selected in the setting information edition screen 520 (current tab) is transmitted to the device. This enables the user to recognize that setting information belonging to the edited current tab is transmitted to the device.

Further, an another-tab confirmation message 562 is also displayed in the confirmation screen 560. The another-tab confirmation message 562 is a message for notifying the user that setting information belonging to a tab other than the tab selected in the setting information edition screen 520 (another tab) has been changed by the user. This enables the user to recognize that setting information belonging to another tab is not transmitted to the device but has been edited.

An OK button 563 is a button by which the user provides instruction to transmit, to the device, setting information targeted for transmission. When the OK button 563 is pressed, the setting information management unit 304 transmits, to the device, setting information targeted for transmission at the time of pressing of the send button 531. The UI control unit 301 then displays the setting information edition screen 520.

Further, when a cancel button 564 is pressed, the setting information management unit 304 cancels the transmission of the setting information to the device. The UI control unit 301 then displays the setting information edition screen 520.

In the confirmation screen 580 of FIG. 5B(4) displayed in response to the all-send button 532 being pressed, tab confirmation messages 581 and 582 are displayed. The tab confirmation messages 581 and 582 are messages for notifying the user that setting information on the tab in the setting information edition screen 520 is transmitted to the device. The tab confirmation message is created on a tab basis for all the tabs in which setting information has been changed. This enables the user to recognize that both the setting information belonging to the edited current tab and the setting information belonging to another tab are transmitted to the device.

An OK button 583 is a button by which the user provides instruction to transmit, to the device, setting information targeted for transmission. When the OK button 583 is pressed, the setting information management unit 304 transmits, to the device, setting information targeted for transmission at the time of pressing of the all-send button 532. The UI control unit 301 then displays the setting information edition screen 520.

Further, when a cancel button 584 is pressed, the setting information management unit 304 cancels the transmission of the setting information to the device. The UI control unit 301 then displays the setting information edition screen 520.

Now, when the user starts up the management program 300 in order to transmit setting information to the devices 102 to 104, the device list 500 (FIG. 5A(1)) is displayed. Furthermore, once the user selects any record (device) from the device list 500 and presses the setting edition button 508, the management apparatus 101 performs a transmission process of setting information illustrated in the flowchart of FIG. 6.

In S601, the UI control unit 301 creates the setting information edition screen 520 based on the device management table 400 and on the setting information management table 420.

Next, in S602, the UI control unit 301 determines whether or not setting information on the setting information edition screen 520 has been changed by the user. If it is determined that setting information has been changed, the process proceeds to S603. Otherwise, the process proceeds to S604.

In S603, the setting information management unit 304 sets the value of the edition status 425 of the corresponding record in the setting information management table 420 to "Edited". The process then proceeds to S604.

In S604, the UI control unit 301 determines whether or not the send button 531 on the setting information edition screen 520 is pressed by the user. If it is determined that the send button 531 is pressed, the process proceeds to S605. Otherwise, the process proceeds to S612.

In S605, the setting information management unit 304 extracts setting information that has been changed by the user on a tab selected on the setting information edition screen 520. The specific extraction method has already been described and will thus be omitted.

Next, in S606, the UI control unit 301 generates a confirmation message related to the selected tab based on the setting information extracted in S605. The current-tab confirmation message 561 of FIG. 5B(3) is an example of the confirmation message generated herein. Note that, if no setting information changed in S605 is extracted, a current-tab confirmation message such as "No setting item to be changed exits in [Environment]" is generated.

Next, in S607, the setting information management unit 304 determines whether or not setting information whose value of the edition status 425 is "Edited" is present in setting information belonging to a tab other than the tab selected on the setting information edition screen 520 in the setting information management table 420. If it is determined that such setting information is present, the process proceeds to S608. Otherwise, the process proceeds to S609.

In S608, the UI control unit 301 generates a confirmation message for the setting information identified in S607. The another-tab confirmation message 562 of FIG. 5B(3) is an example of a confirmation message generated herein. The process then proceeds to S609.

Note that, even when setting items of a plurality of tabs are identified in S607, this situation can be addressed by the UI control unit 301 listing the values of the tab name 422 or creating the another-tab confirmation message 562 on a tab basis.

In S609, the UI control unit 301 displays the confirmation screen 560 including the confirmation message generated in S606 and S608.

Next, in S610, the UI control unit 301 determines whether or not the OK button 563 is pressed in the confirmation screen 560 by the user. If it is determined that the OK button 563 is pressed, the process proceeds to S611. Otherwise, the UI control unit 301 determines that the cancel button 564 is pressed, and the process returned to S602.

In S611, the setting information management unit 304 transmits the setting information extracted in S605 to the device identified by the serial number 521 of the setting information edition screen 520 and ends the present flowchart. The UI control unit 301 then displays the setting information edition screen 520. Note that, when no setting information is extracted in S605, the setting information management unit 304 does not transmit any setting information to the device.

In S612, the UI control unit 301 determines whether or not the all-send button 532 on the setting information edition screen 520 is pressed by the user. If it is determined that the all-send button 532 is pressed, the process proceeds to S613. Otherwise, the process returns to S602.

Next, in S613, the setting information management unit 304 extracts setting information changed by the user on all the tabs on the setting information edition screen 520. Since this operation is the same as S605 except that setting information in all the tabs 526 to 528 instead of in a particular tab selected from the tabs 526 to 528 is targeted, the detailed description thereof will be omitted.

Next, in S614, the UI control unit 301 generates a confirmation message related to the setting information extracted in S613. The confirmation message is required to be able to identify a tab including setting information extracted in S613. The tab confirmation messages 581 and 582 of FIG. 5B(4) are the examples thereof. Since the value of the tab name 422 is included in the tab confirmation messages 581 and 582, the user is able to recognize which tab the changed setting information belongs to. Note that, when no setting information extracted in S613 is present, the UI control unit 301 generates a confirmation message that makes it possible to recognize that no setting information has been extracted, such as "No setting item to be changed exists.".

Next, in S615, the UI control unit 301 displays the confirmation screen 580 including the confirmation message generated in S614.

Next, in S616, the UI control unit 301 determines whether or not the OK button 583 is pressed on the confirmation screen 580 by the user. If it is determined that the OK button 583 is pressed, the process proceeds to S617. Otherwise, the UI control unit 301 determines that the cancel button 584 is pressed, and the process returns to S602.

In S617, the setting information management unit 304 transmits setting information extracted in S613 to the device identified by the serial number 521 of the setting information edition screen 520 and ends the present flowchart. The UI control unit 301 then displays the setting information edition screen 520. Note that, when no setting information extracted in S613 is present, the setting information management unit 304 does not transmit any setting information to the device.

Figure 6:
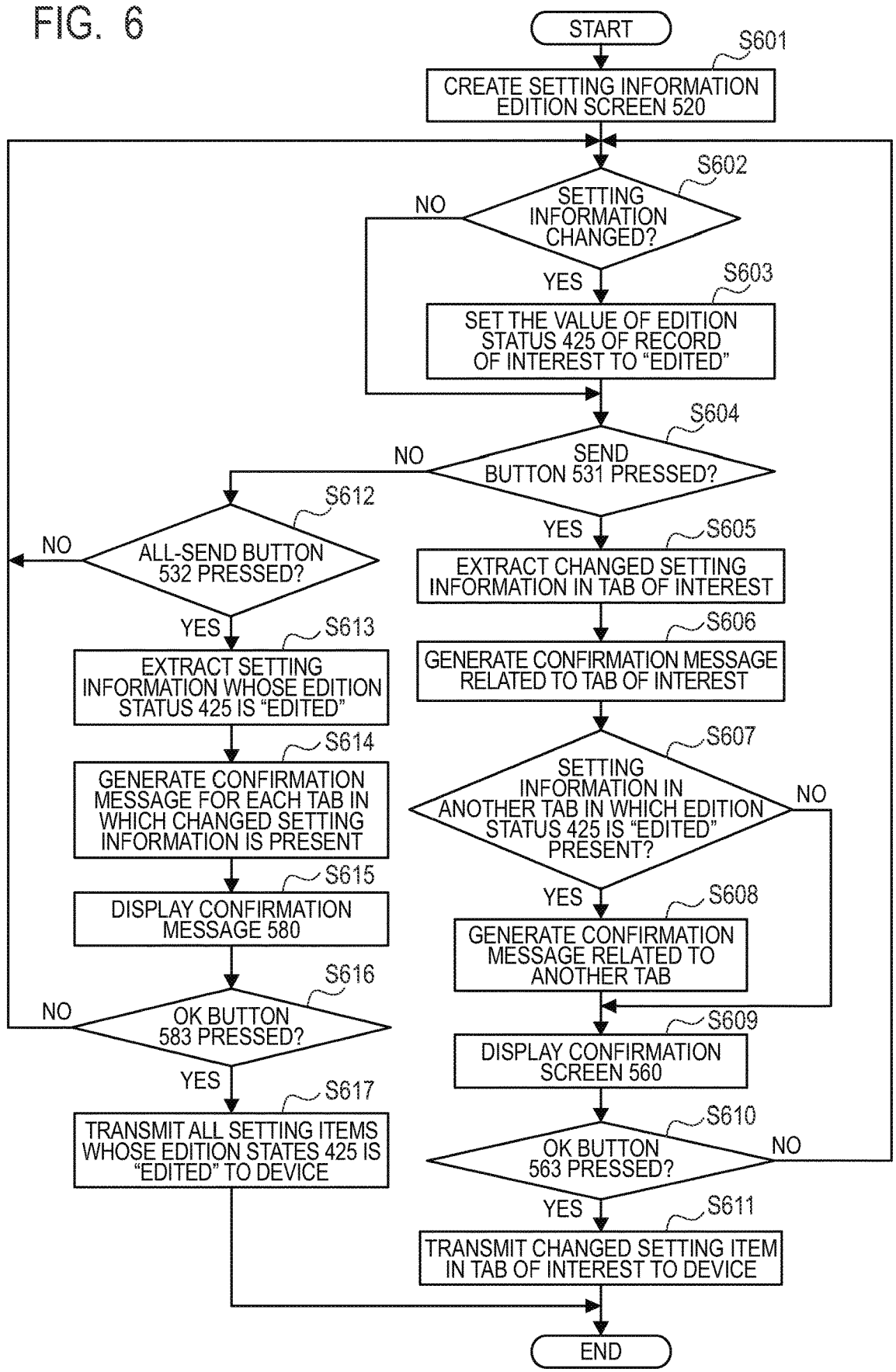
FIG. 6 is a flowchart illustrating a transmission process of setting information according to the present disclosure.

This is the end of the description of the flowchart of FIG. 6.

According to the first embodiment, even when pieces of setting information are changed across a plurality of tabs, the user is able to recognize the changes in setting information on a device without omission. Further, the user presses the OK button 563 or 583 after recognizing the changes across a plurality of tabs and thus is able to reliably perform edition of setting information on a device.

Second Embodiment

In the first embodiment, the process in displaying the confirmation screen 560 or 580 when the send button 531 or the all-send button 532 on the setting information edition screen 520 is pressed has been described. This process enables the management apparatus 101 to notify the user of setting information on all the tabs including changed setting items and then transmit the setting information to a device. In the second embodiment, an example of more efficiently transmitting edited setting information to a device will be described. Features different from the first embodiment will be mainly described below.

Figure 7A:
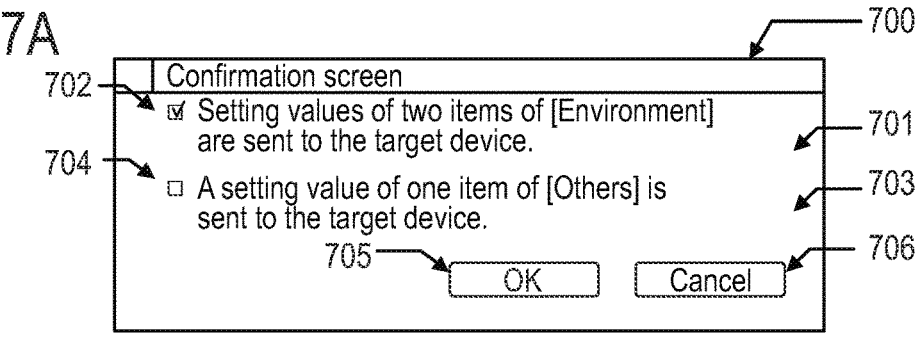
FIG. 7A illustrates an example of a UI screen of the management apparatus according to the present disclosure.
Figure 7B:
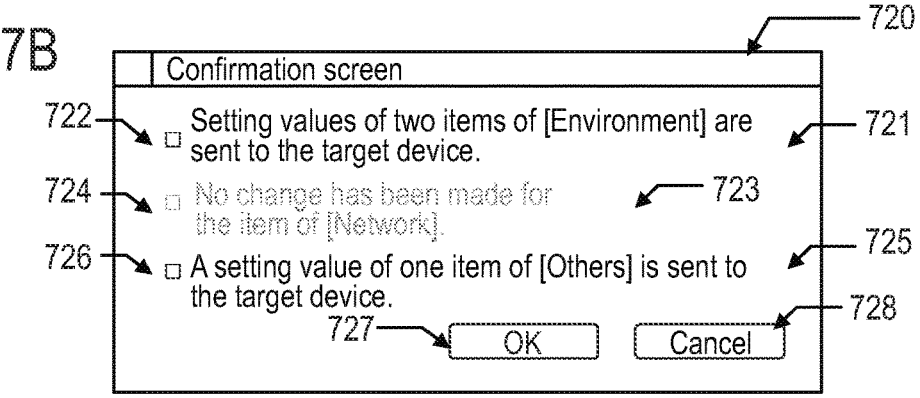
FIG. 7B illustrates an example of a UI screen of the management apparatus according to the present disclosure.
Figure 7C:
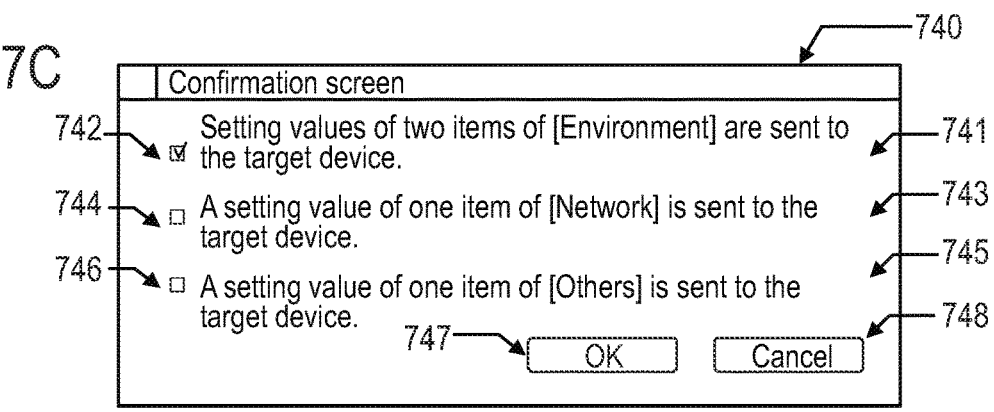
FIG. 7C illustrates another example of a UI screen of the management apparatus according to the present disclosure.
Figure 7D:
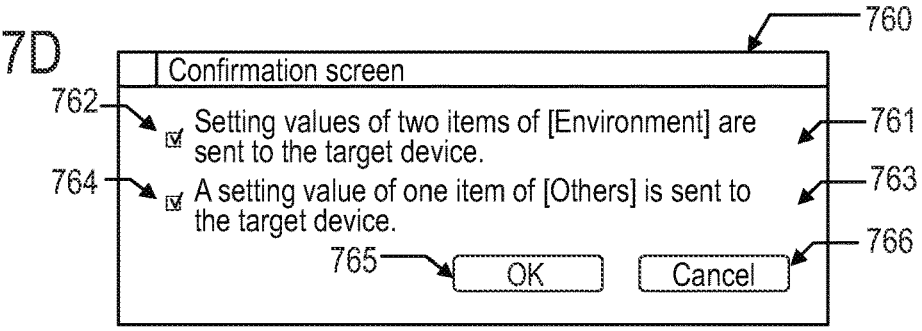
FIG. 7D illustrates another example of a UI screen of the management apparatus according to the present disclosure.
Figure 7E:
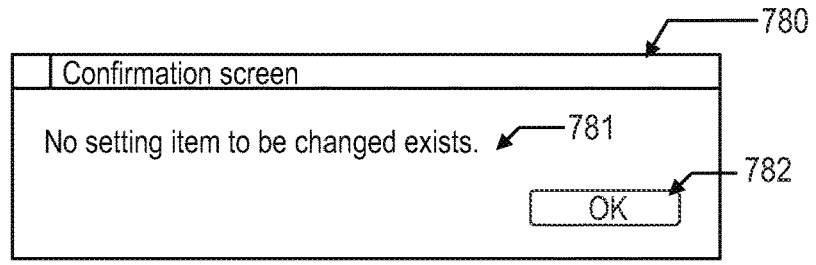
FIG. 7E illustrates another example of a UI screen of the management apparatus according to the present disclosure.

FIG. 7A to FIG. 7E illustrate examples of respective confirmation screens displayed when setting information edited in the setting information edition screen 520 is transmitted. Confirmation screens 700, 720, and 740 of FIG. 7A to FIG. 7C are examples of respective confirmation screens displayed when the send button 531 is pressed on the setting information edition screen 520. The confirmation screen 760 of FIG. 7D is an example of a confirmation screen displayed when the all-send button 532 is pressed on the setting information edition screen 520. Further, a confirmation screen 780 of FIG. 7E is an example of a confirmation screen displayed when the send button 531 or the all-send button 532 is pressed on the setting information edition screen 520 in a state where none of setting items has been changed.

Note that, in the first embodiment, when the send button 531 is pressed, only the setting information belonging to a tab selected in the setting information edition screen 520 out of the setting information changed by the user is extracted. In the second embodiment, however, it is required to extract the changed setting information belonging also to another tab. Specifically, when the send button 531 is pressed, changed setting information belonging to all the tabs is extracted in the same manner as the case where the all-send button 532 is pressed.

Now, the confirmation screen 700 of FIG. 7A is displayed if all the following conditions (1) to (3) are satisfied.

(1) At least one piece of setting information belonging to at least one of the tabs 526 to 528 on the setting information edition screen 520 has been changed.

(2) None of the pieces of setting information belonging to at least one of the tabs 526 to 528 on the setting information edition screen 520 has been changed.

(3) The send button 531 has been pressed in a tab satisfying condition (1).

As an example, a state where setting information included in the environment tab 526 and setting information included in the others tab 528 have been changed by the user and none of the pieces of setting information included in the network tab 527 has been changed is assumed. If the send button 531 of the environment tab 526 is pressed in this state, the confirmation screen 700 illustrated in FIG. 7A is displayed.

In the confirmation screen 700 of FIG. 7A, a current-tab confirmation message 701 and an associated checkbox 702 are displayed. When sending setting information belonging to the current tab (herein, the environment tab 526) to the device, the user checks the checkbox 702 to ON (selected state). Since the confirmation screen 700 is displayed when the send button 531 is pressed in the current tab and the checkbox 702 is for the current-tab confirmation message 701, the initial state of the checkbox 702 is ON. However, the user may change the checkbox state from the initial state.

Further, in the confirmation screen 700, an another-tab confirmation message 703 and an associated checkbox are displayed. When sending setting information belonging to another tab (herein, the others tab 528) to the device, the user checks the checkbox 704 to ON. Since the checkbox 704 is for the another-tab confirmation message 703, the initial state thereof is a non-selected state (OFF).

When an OK button 705 is pressed in the confirmation screen 700, the setting information management unit 304 transmits, to the device, changed setting information belonging to the tab corresponding to the checkbox 702 whose selection status is ON. The UI control unit 301 then displays the setting information edition screen 520.

When a cancel button 706 is pressed, the setting information management unit 304 cancels the transmission of the setting information to the device. The UI control unit 301 then displays the setting information edition screen 520.

Note that, in the example of the confirmation screen 700 of FIG. 7A, since none of the pieces of setting information included in the network tab 527 has been changed, no another-tab confirmation message related to the network tab 527 is displayed. However, for example, the message and the checkbox for the network tab 527 may be displayed on the confirmation screen 700 in a grayed-out state so that the user is unable to select the checkbox.

The confirmation screen 720 of FIG. 7B is displayed if all the following conditions (4) to (6) are satisfied.

(4) At least one setting information belonging to at least one of the tabs 526 to 528 on the setting information edition screen 520 has been changed.

(5) None of the pieces of setting information belonging to at least one of the tabs 526 to 528 on the setting information edition screen 520 has been changed.

(6) The send button 531 has been pressed in a tab satisfying condition (5).

As an example, a state where setting information included in the environment tab 526 and setting information included in the others tab 528 have been changed by the user and none of the pieces of setting information included in the network tab 527 has been changed is assumed. If the send button 531 of the network tab 527 is pressed in this state, the confirmation screen 720 illustrated in FIG. 7B is displayed.

In the confirmation screen 720 of FIG. 7B, with respect to the first another tab (herein, the environment tab 526), an another-tab confirmation message 721 and an associated checkbox 722 are displayed. When sending setting information in another tab to the device, the user checks the checkbox 722 to ON. Since the checkbox 722 is for the another-tab confirmation message 721, the initial state thereof is OFF.

Further, in the confirmation screen 720, a current-tab confirmation message 723 and an associated checkbox 724 are displayed for the current tab (herein, the network tab 527). Since none of the pieces of setting information included in the network tab 527 has been changed, the current-tab confirmation message 723 and the checkbox 724 are displayed in a grayed-out state so that the user is unable to select the checkbox.

Note that, since the confirmation screen 720 is displayed because the send button 531 in the network tab 527 is pressed, it is not desirable to hide the current-tab confirmation message 723 and the checkbox 724.

Further, since an another-tab message 725 and a checkbox 726 for the second another tab (herein, the others tab 528) are the same as the another-tab confirmation message 721 and the checkbox 722, respectively, the detailed description thereof will be omitted.

When the OK button is pressed in the confirmation screen 720, the setting information management unit 304 transmits, to the device, changed setting information belonging to tabs corresponding to the checkboxes 722 and 726 whose selection status is ON. The UI control unit 301 then displays the setting information edition screen 520. When a cancel button 728 is pressed, the setting information management unit 304 cancels the transmission of the setting information to the device. The UI control unit 301 then displays the setting information edition screen 520.

The confirmation screen 740 of FIG. 7C is displayed if the following conditions (7) and (8) are satisfied.

(7) At least one changed setting information is included in all of the tabs 526 to 528 on the setting information edition screen 520.

(8) The send button 531 has been pressed in any tab.

As an example, in a state where condition (7) is satisfied, it is assumed that the send button 531 is pressed in the environment tab 526. In such a case, the confirmation screen 740 illustrated in FIG. 7C is displayed.

In the confirmation screen 740 of FIG. 7C, a current-tab confirmation message 741 and an associated checkbox 742 are displayed for the environment tab 526. When sending setting information in the current tab to the device, the user checks the checkbox 742 to ON. Since the checkbox 742 is for the current-tab confirmation message 741, the initial state thereof is ON.

Further, in the confirmation screen 740, an another-tab confirmation message 743 and an associated checkbox 744 and an another-tab confirmation message 745 and an associated checkbox 746 are displayed.

When sending setting information in another tab to the device, the user checks a desired checkbox 744 or 746 to ON. Since the checkboxes 744 and 746 are for the another-tab confirmation messages 743 and 745, respectively, the initial states thereof are OFF.

When an OK button 747 is pressed in the confirmation screen 740, the setting information management unit 304 transmits, to the device, changed setting information in tabs corresponding to the checkboxes 742, 744, or 746 whose selection status is ON. The UI control unit 301 then displays the setting information edition screen 520.

Further, when a cancel button 748 is pressed, the setting information management unit 304 cancels the transmission of the setting information to the device. The UI control unit 301 then displays the setting information edition screen 520.

The confirmation screen 760 of FIG. 7D is an example of a confirmation screen displayed when the all-send button 532 is pressed in the setting information edition screen 520.

In the confirmation screen 760 of FIG. 7D, tab confirmation messages 761 and 763 and checkboxes 762 and 764 are displayed for the environment tab 526 and the others tab 528. The tab confirmation message is created on a tab basis for all the tabs in which setting information has been changed and is for notifying the user that the setting information has been changed by the user.

When sending setting information in each tab to the device, the user checks the checkboxes 762 and 764 to ON. Since the confirmation screen 760 is a screen displayed when the all-send button 532 is pressed, the initial states of checkboxes 762 and 764 are ON. Note that, also for a tab in which no setting information has been changed (herein, the network tab 527), the message and the checkbox may be displayed on the confirmation screen 760 in a grayed-out state so that the user is unable to select the checkbox.

When an OK button 765 is pressed in the confirmation screen 760, the setting information management unit 304 transmits, to the device, changed setting information in tabs corresponding to the checkboxes 762 and 764 whose selection status is ON. The UI control unit 301 then displays the setting information edition screen 520. Further, when a cancel button 766 is pressed, the setting information management unit 304 cancels the transmission of the setting information to the device. The UI control unit 301 then displays the setting information edition screen 520.

The confirmation screen 780 of FIG. 7E is an example of a confirmation screen displayed when the send button 531 or the all-send button 532 is pressed on the setting information edition screen 520 in a state where none of the setting items has been changed.

In the confirmation screen 780 of FIG. 7E, a confirmation message 781 is displayed. The confirmation message 781 is for notifying the user that none of the pieces of setting information has been changed by the user. When an OK button 782 is pressed in the confirmation screen 780, the UI control unit 301 displays the setting information edition screen 520.

Figure 8:
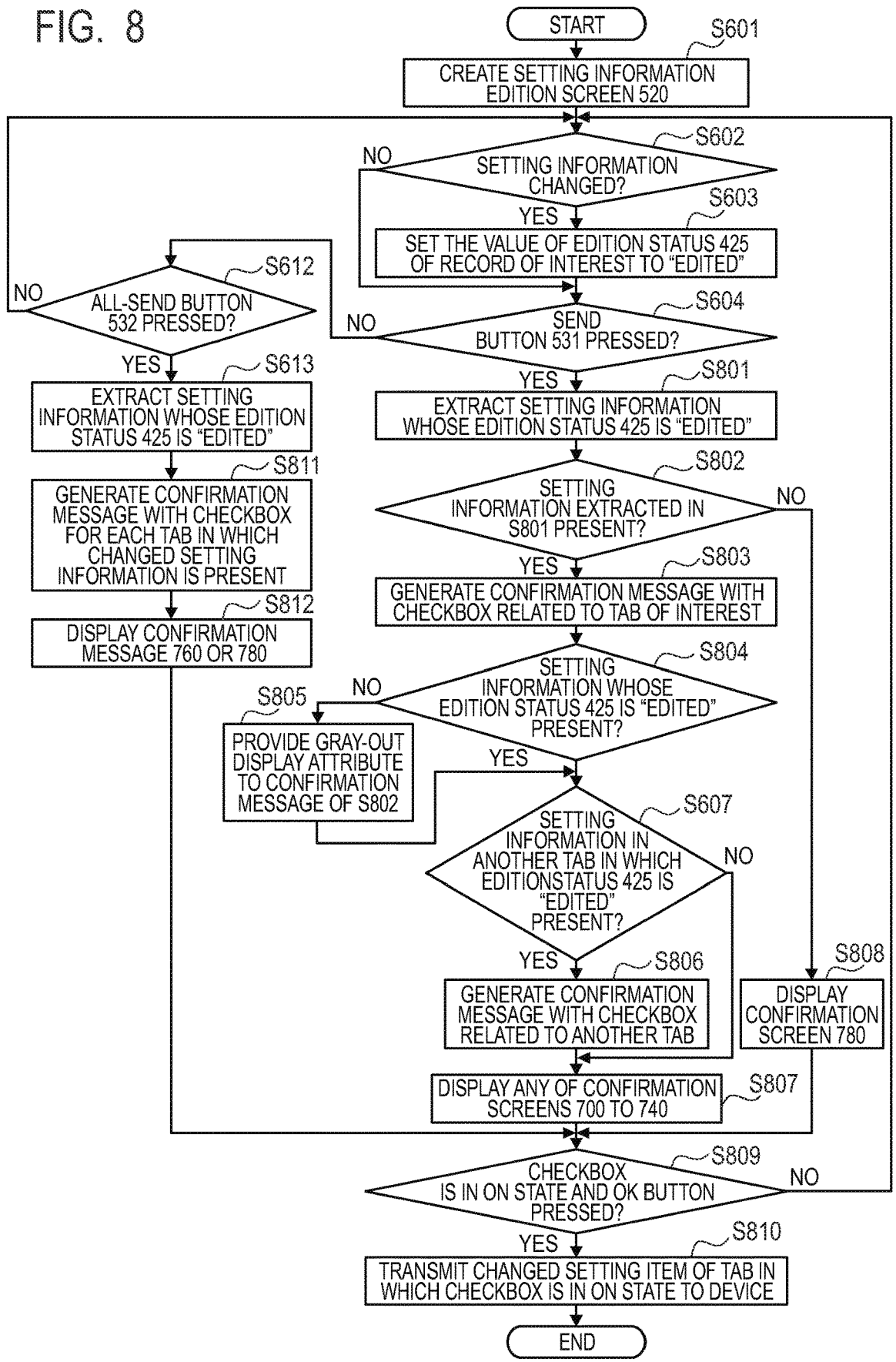
FIG. 8 is a flowchart illustrating a transmission process of setting information according to the present disclosure.

Now, in the same manner as the first embodiment, once the user selects any record (device) from the device list 500 and presses the setting edition button 508, the management apparatus 101 performs a transmission process of setting information illustrated in a flowchart of FIG. 8.

In S601, the UI control unit 301 creates the setting information edition screen 520 based on the device management table 400 and on the setting information management table 420.

Next, in S602, the UI control unit 301 determines whether or not setting information on the setting information edition screen 520 has been changed by the user. If it is determined that setting information has been changed, the process proceeds to S603. Otherwise, the process proceeds to S604.

In S603, the setting information management unit 304 sets the value of the edition status 425 of the corresponding record in the setting information management table 420 to "Edited". The process then proceeds to S604.

In S604, the UI control unit 301 determines whether or not the send button 531 on the setting information edition screen 520 is pressed by the user. If it is determined that the send button 531 is pressed, the process proceeds to S801. Otherwise, the process proceeds to S812.

Note that the operations of S601 to S604 are the same as those described in the first embodiment.

In S801, the setting information management unit 304 extracts setting information changed by the user on all the tabs on the setting information edition screen 520.

Next, in S802, it is determined whether or not one or more pieces of setting information extracted in S801 are present.

If it is determined that one or more pieces of setting information are present, the process proceeds to S803. Otherwise, the process proceeds to S808.

In S803, based on the setting information extracted in S801, the UI control unit 301 generates a confirmation message with a checkbox related to a tab currently selected in the setting information edition screen 520. The current-tab confirmation message 701 and the checkbox 702 of FIG. 7A and the current-tab confirmation message 723 and the checkbox 724 of FIG. 7B are examples of the confirmation message with a checkbox generated herein.

Next, in S804, the setting information management unit 304 determines whether or not setting information whose value of the edition status 425 in the setting information management table 420 is "Edited" is present for the tab selected in the setting information edition screen 520.

If it is determined that such setting information is present, the process proceeds to S607. Otherwise, the process proceeds to S805.

In S805, a gray-out display attribute is provided to the current-tab confirmation message and the checkbox generated in S803. With this attribute being provided, the current-tab confirmation message and the checkbox will be displayed in a grayed-out state and selection by the user will be disabled when the confirmation screen is displayed in S807 described later. The process then proceeds to S607.

In S607, the setting information management unit 304 determines whether or not setting information whose value of the edition status 425 is "Edited" is present for a tab other than the tab currently selected on the setting information edition screen 520 in the setting information management table 420. Note that S607 is the same as the operation described in the first embodiment. If it is determined that such setting information is present, the process proceeds to S806. Otherwise, the process proceeds to S807.

In S806, based on the setting information extracted in S801, the UI control unit 301 generates a confirmation message with a checkbox related to a tab other than the tab currently selected on the setting information edition screen 520. The another-tab confirmation message 703 and the checkbox 704 of FIG. 7A are the example of the confirmation message with a checkbox generated herein. The process then proceeds to S807.

In S807, the UI control unit 301 displays the confirmation messages with the checkboxes generated in S803 and S806 on any of the confirmation screen 700, the confirmation screen 720, and the confirmation screen 740. The display conditions for respective confirmation screens are as described in the illustration for FIG. 7A to FIG. 7C. The process then proceeds to S809. Further, in S808, the UI control unit 301 displays the confirmation screen 780. The process then proceeds to S809.

In S612, the UI control unit 301 determines whether or not the all-send button 532 on the setting information edition screen 520 is pressed by the user. If it is determined that the all-send button 532 is pressed, the process proceeds to S613. Otherwise, the process returns to S602. The setting information changed by the user is extracted on all the tabs on the edition screen 520. Note that S612 and S613 are the same as the operations described in the first embodiment.

Next, in S811, the UI control unit 301 generates a confirmation message with a checkbox for setting information extracted in S613. The tab confirmation messages 761 and 763 of FIG. 7D are examples of the confirmation message with a checkbox generated herein. Note that, when no setting information is extracted in S613, the UI control unit 301 generates confirmation message that enables the user to recognize that no setting information has been extracted, such as "No setting item to be changed exists.". No checkbox is provided to this confirmation message.

Next, in S812, if one or more pieces of setting information extracted in S613 are present, the UI control unit 301 displays the confirmation message with the checkbox generated in S811 on the confirmation screen 760. If no setting information is extracted, the confirmation screen 780 is displayed. The process then proceeds to S809.

In S809, the UI control unit 301 determines whether or not the selection status of at least one checkbox on the confirmation screens 700, 720, 740, 760, and 780 is ON and any of the OK buttons 705, 727, 747, and 765 is pressed. If it is determined that any OK button is pressed, the process proceeds to S810. Otherwise, the UI control unit 301 determines that any of the cancel buttons 706, 728, 748, and 766 and the OK button 782 is pressed, and the process returns to S602.

In S810, out of the setting information extracted in S801 or S613, the setting information management unit 304 transmits setting information belonging to a tab in which the state of the checkbox is ON to the device identified by the serial number 521 in the setting information edition screen 520. The present flowchart then ends. The UI control unit 301 then displays the setting information edition screen 520. Note that, when there is no setting information to be transmitted, the setting information management unit 304 does not transmit any setting information to the device.

This is the end of the description of the flowchart of FIG. 8.

According to the second embodiment, even when pieces of setting information are changed across a plurality of tabs, the user is able to effectively send the setting information on a device to the device without omission.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiments of the present disclosure, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-148693, filed Sep. 4, 2020, which is hereby incorporated by reference herein in its entirety.

What is claimed is:

1. A management apparatus for managing an image forming device, the management apparatus comprising:
    at least one memory that stores instructions; and
    at least one processor that executes the instructions to perform:
    on a user interface, displaying a plurality of tabs in a selectable manner to edit setting information of the image forming device, wherein, in response to a selection of respective tabs, a different combination of setting items is displayed;
    receiving designations for editing of respective values of a plurality of setting items corresponding to two tabs;
    accepting a first instruction to transmit setting information to the image forming device after the designations have been received; and
    displaying a first message related to setting information corresponding to one selected tab being selected at a time when the first instruction has been accepted and a second message related to setting information corresponding to another tab, the second message being a user notification for reminding a user about a changed setting value in the another tab,
    wherein the first message and the second message are displayed on a confirmation screen.

2. The management apparatus according to claim 1, wherein the first message includes a message indicating that one or more edited values based on at least one of the received designations about one or more setting items corresponding to the one selected tab are transmitted to the image forming device.

3. The management apparatus according to claim 1, wherein the second message includes a message indicating that one or more edited values based on at least one of the received designations about one or more setting items corresponding to the another tab are not transmitted to the image forming device by the first instruction.

4. The management apparatus according to claim 1, wherein whether or not to transmit setting information to the image forming device is able to be changed on the second user interface.

5. The management apparatus according to claim 1, wherein the at least one processor further executes the instructions to perform accepting a second instruction to transmit setting information including all of the edited values based on the received designations to the image forming device.

6. The management apparatus according to claim 5, wherein the at least one processor further executes the instructions to perform displaying a third message indicating that all of the edited values about respective tabs are transmitted to the image forming device according to the second instruction.

7. A control method of a management apparatus for managing an image forming device, the control method comprising:
    on a user interface, displaying a plurality of tabs in a selectable manner to edit setting information of the image forming device, wherein, in response to a selection of respective tabs, a different combination of setting items is displayed;
    receiving designations for editing of respective values of a plurality of setting items corresponding to two tabs;
    accepting a first instruction to transmit setting information to the image forming device after the designations have been received; and
    displaying a first message related to setting information corresponding to one selected tab being selected at a time when the first instruction has been accepted and a second message related to setting information corresponding to another tab, the second message being a user notification for reminding a user about a changed setting value in the another tab,
    wherein the first message and the second message are displayed on a confirmation screen.

8. A non-transitory computer readable storage medium storing instructions that causes a computer to perform:
    on a user interface, displaying a plurality of tabs in a selectable manner to edit setting information of the image forming device, wherein, in response to a selection of respective tabs, a different combination of setting items is displayed;
    receiving designations of edition of respective values of a plurality of setting items corresponding to two tabs;
    accepting a first instruction to transmit setting information to the image forming device after the designations have been received; and
    displaying a first message related to setting information corresponding to the one selected tab being selected at a time when the first instruction has been accepted and a second message related to setting information corresponding to another tab, the second message being a user notification for reminding a user about a changed setting value in the another tab, wherein the first message and the second message are displayed on a confirmation screen.

9. A management apparatus for managing an image forming device, the management apparatus comprising:

at least one memory that stores instructions; and at least one processor that executes the instructions to perform:

on a user interface, displaying a plurality of tabs in a selectable manner to edit setting information of the image forming device, wherein, in response to a selection of respective tabs, a different combination of setting items is displayed;

receiving designations for editing of respective values of a plurality of setting items corresponding to two tabs;

accepting an instruction to transmit setting information to the image forming device after the designations have been received; and displaying a message indicating that one or more edited values based on at least one of the received designations are not transmitted to the image forming device by the instruction, wherein the one or more edited values are values based on the editing of respective values of one or more setting items corresponding to a tab different from one selected tab being selected at a time when the instruction has been accepted.

* * * * *